United States Patent

[11] 3,611,821

| [72] | Inventor | William F. Legler |
| | | Bettendorf, Iowa |
| [21] | Appl. No. | 855,969 |
| [22] | Filed | Sept. 8, 1969 |
| [45] | Patented | Oct. 12, 1971 |
| [73] | Assignee | J. I. Case Company |

[54] VARIABLE SPEED DRIVE PULLEY
10 Claims, 4 Drawing Figs.

[52] U.S. Cl. ............................................. 74/230.17
[51] Int. Cl. .................................................. F16h 55/52
[50] Field of Search............................................ 74/230.17, 230.17 A, 230.17 C

[56] References Cited
UNITED STATES PATENTS

| 2,635,474 | 4/1953 | Hennings | 74/230.17 C |
| 2,746,307 | 5/1956 | Zatko | 74/230.17 C |
| 3,027,773 | 4/1962 | Firth et al. | 74/230.17 C |
| 3,034,366 | 5/1962 | Tann | 74/230.17 C |
| 3,107,545 | 10/1963 | Zatko | 74/230.17 C |
| 3,174,348 | 3/1965 | Luenberger | 74/230.17 C |
| 3,383,934 | 5/1968 | Flynn | 74/230.17 C |

Primary Examiner—C. J. Husar
Attorney—Dressler, Goldsmith, Clement & Gordon

ABSTRACT: A variable speed pulley in which the two sheave halves are identical in construction and each includes a hub, a flat substantially circular plate fixed to the hub, and a sheet metal disc defining the bearing surface for a belt received between the sheave halves. The plate has circumferentially spaced radially extending slots extending from the peripheral surface towards the center thereof and the sheet metal disc has deformed portions circumferentially spaced and extending radially to define elongated ribs, the inner ends of which are received in the slots on the plate. The plate and disc are interconnected and the ribs and slots cooperate to prevent relative rotation between the plate and disc. The variable speed pulley may also include pins fixedly secured in one set of openings defined on one sheave half and having opposite ends received in identical openings in the second sheave half with the pins cooperating to define the minimum diameter of the pulley.

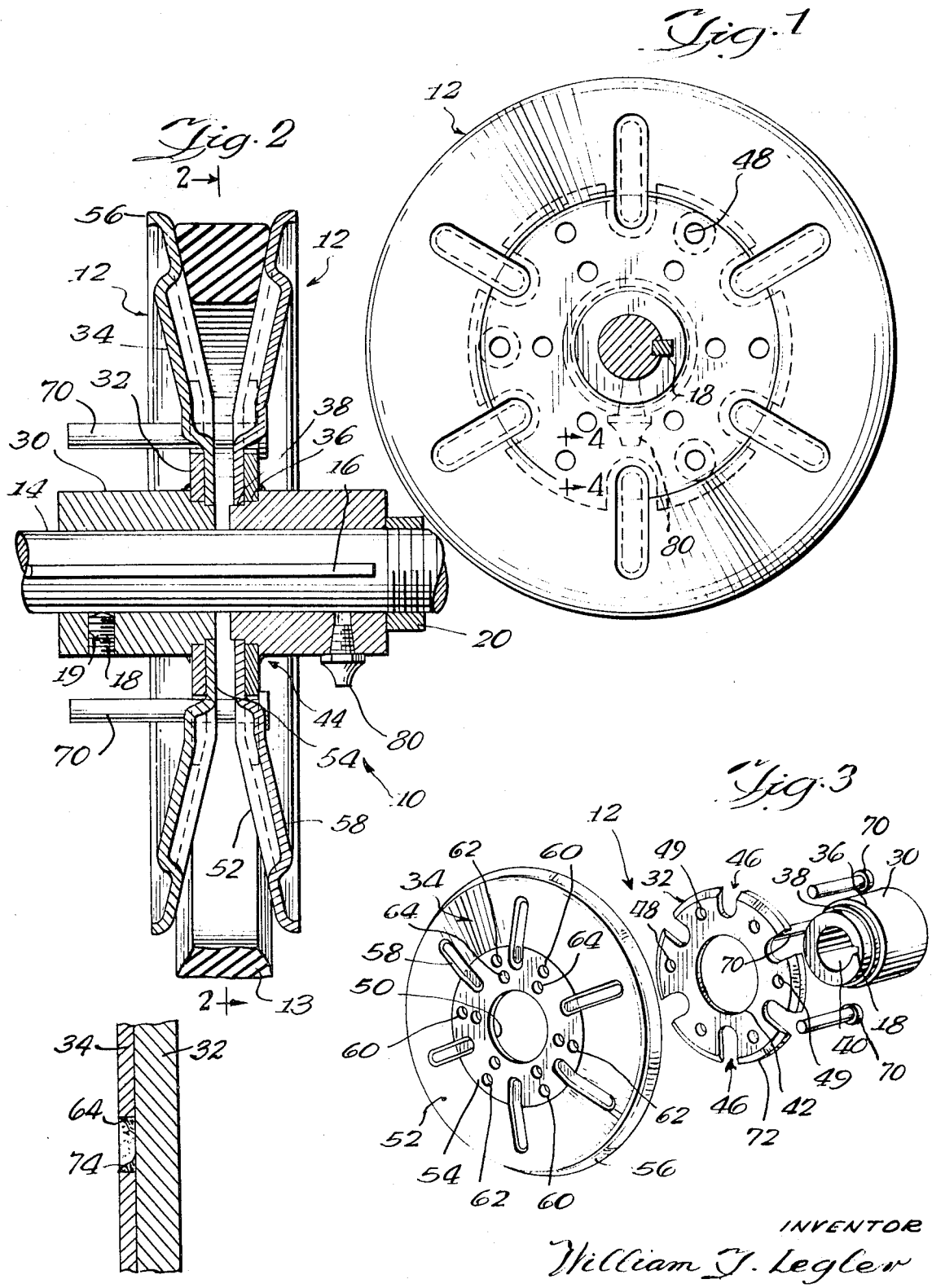

VARIABLE SPEED DRIVE PULLEY

BACKGROUND OF THE INVENTION

The present invention relates generally to pulleys and more particularly to an improved sheave half for a variable speed pulley.

While variable speed pulleys have been known for years, there is a constant and ever-increasing demand for reducing the cost of such devices while still maintaining the advantageous features of previously known pulleys.

Generally, variable speed pulleys include two sheave halves and each of the sheave halves has a central hub with the diameter of the opening in one hub being slightly greater than that in the other hub to be able to receive the other hub. The other hub has the smaller opening which receives a shaft and is fixedly secured thereto for rotation therewith.

Heretofore, it has been rather conventional to form each of the sheave halves by casting or otherwise forming a one-piece member which included the central hub and the coned shaped member extending from one end of the hub. The one-piece member would necessarily have to be designed to withstand substantial axial forces and resist deformation and destruction under relatively high axial stresses. This meant that the entire mechanism would require a substantial amount of metal and would further require that the belt-bearing surface be contoured with extreme accuracy. The substantial amount of metal, as well as the various operations for producing sheave halves, has considerably added to the cost of manufacture of such devices. Furthermore, the difference in construction of the respective sheave halves required a substantial inventory.

SUMMARY OF THE INVENTION

The present invention provides an improved variable speed pulley in which the sheave halves are identical in construction so as to reduce the amount of inventory by 50 percent. The respective sheave halves each include a hub having a central aperture for receiving a shaft, a substantially flat circular plate fixedly secured to one end of the hub and a sheet metal member or disc connected to the plate.

The interconnecting means between the plate and the sheet metal member includes a plurality of circumferentially spaced radially extending elongated deformed portions on the disc, the inner ends of which are received in slots extending radially from the peripheral surface of the plate with the ribs and slots being maintained in a fixed position relative to each other by welding the disc to the plate.

Each plate and disc further include a plurality of circumferentially spaced aligned openings with the openings of one of the plates and discs having pins fixedly secured therein. The opposite ends of the pins are received in the respective ones of the openings defined in the other plate and disc and the pins cooperate to define the minimum diameter of the variable speed pulley.

BRIEF DESCRIPTION OF DRAWINGS

FIG. 1 of the drawings shows a side elevational view of one of the sheave halves constructed in accordance with the present invention and viewed generally along lines 2—2 of FIG. 2;

FIG. 2 is a vertical sectional view of the two sheave halves mounted on a shaft;

FIG. 3 is an exploded perspective view of the various parts forming one of the sheave halves of the present invention; and FIG. 4 is an enlarged fragmentary sectional view taken generally along lines 4—4 of FIG. 1.

DETAILED DESCRIPTION

Referring more in detail to the drawings, and particularly to FIG. 1, reference numeral 10 designates a variable speed drive pulley constructed in accordance with the present invention and having a belt 13 supported thereon. The variable speed drive pulley includes first and second sheave halves 12, which are identical in construction and which are supported on a common shaft 14. The respective sheave halves 12 are secured to the shaft 14, so as to be rotatable therewith, as by a key 16 on the shaft and keyways 18 formed on the respective sheave halves. One of the sheave halves is fixedly secured to the shaft 14 by a setscrew 18 receiving in a threaded opening 19 while the opposite or second sheave half is axially shiftable with respect to the shaft.

In the illustrated embodiment, the axial shifting of the shaft is accomplished by a nut 20 threaded on the shaft and engaging one outer end of the movable sheave half. It will be appreciated that the wedging action of the belt 13 tends to maintain the movable sheave half in engagement with the nut 20. While the adjustment for increasing and decreasing the effective diameter of the variable speed pulley has been shown as a nut, it is readily apparent that various other biasing mechanisms may be utilized in connection with the variable speed pulley constructed in accordance with the present invention. However, since the biasing mechanism or adjusting mechanism forms no part of the present invention, no detailed description thereof appears to be necessary.

According to the present invention, the two sheave halves 12 are identical in construction and each include a hub 30, a substantially flat circular plate 32 and a disc 34. The hub 30 has first and second reduced portions 36 and 38 on one end thereof and an opening 40 extending therethrough with the keyway 18 extending axially within the opening.

The plate 32 also has an opening or aperture 42 therein which receives the first reduced portion 36 and the plate 32 is fixedly secured to the hub 30, as by a weld 44. The plate 32 further includes a plurality of circumferentially spaced slots 46 which extend radially from the peripheral edge of the plate towards the center thereof. The plate 32, which is circular and flat, has first and second groups of three radially spaced openings 48 and 49, for a purpose which will become apparent hereinafter.

The disc 34 is a sheet metal member which substantially circular and has a central aperture or opening 50 that receives the second reduced portion 38 of the hub 30. The sheet metal member or disc further includes an inclined outer end portion 52 and a substantially flat inner end portion 54 with the free edge of the outer end portion having an outwardly directed rib or member 56 defining reinforcing means for the outer edge of the sheet metal member. The sheet metal member further includes a plurality of deformed portions 58 which define elongated radially extending ribs that extend away from the belt-bearing surface defined by the one surface of the inclined portion 52. The flat portion of the sheet metal member or disc 34 further includes a first set of three openings 60, a second set of three openings 62 and a third set of openings 64, for a purpose which will become apparent hereinafter.

The manner of assembling the sheave half 12 is to locate the first reduced portion 36 of the hub into the aperture 42 of the plate with one surface of the plate engaging a shoulder defined on the hub and fixedly secure the plate 32 or back up member to the hub 30, as by welding 44. The sheet metal member 34 is then arranged with the hub so that the reduced section or portion 38 of the hub 30 is received into the central aperture 50 and one surface of the sheet metal disc engages a shoulder defined between reduced portions 36 and 38. The flat inner end portion 54 of the sheet metal member 34 is forced into extended engagement with the flat surface of the backing plate 32 and the inner end of the ribs 58 are received in respective ones of the slots 46. Also, the inner edge of the inclined portion 52 of the disc is in extended engagement with the tapered portion 72 of the surface defined on the plate 32.

Once the sheet metal member or disc is located in the manner just described, the plate and the sheet metal member are further interconnected by plug welding the disc to the plate 32 with the welding preferably being accomplished by utilizing the group of holes 64, as shown in FIG. 4. The use of plug welding 74 allows the biasing surface of the sheave half to be free of any projections and allows the two sheave halves to be moved into contacting engagement thereby being capable of achieving a maximum diameter pulley with a rather small disc.

In the assembled condition, the ribs 58 and the slots 46 as well as the plug welding 74 in the aperture 64 defines cooperating means which fixedly connect the disc to the plate and the inner surface of the inclined portion 52 defines the bearing surface for a belt.

If a minimum diameter for the pulley is desired the pin 70 may then be inserted through the first set of openings 48 and 60 in one sheave half 12 and welded therein. The free ends of the pins 70 are then received into the openings 48 and 60 in the second sheave half 12 and the pins cooperate to define the minimum diameter for the pulley. The pins are advantageous in that they prevent the belt 13 from engaging the peripheral surface of the shaft to greatly reduce wear on the belt.

As can be appreciated, forming the sheave halves in the manner described above, allows two sheave halves of identical construction to be formed thereby substantially reducing the necessary inventory of parts for making variable speed pulleys. Furthermore, by utilizing the sheet metal member for the belt-engaging portion of the sheave half greatly reduces the cost of the entire assembly. The particular construction allows for production costs savings on the order of 15–20 percent when compared with constructions of most commercially available type of sheave halves presently being manufactured. Furthermore, making both sheave halves of identical construction greatly reduces the necessary equipment for making variable speed pulleys.

The two sheave halves 12 are then assembled on the shaft 14 by axially aligning the keyways 18 with the key 16 and fixedly securing one of the sheave halves, as by the setscrew 18 and the second sheave halve is then allowed to slide axially relative to the first sheave half. The opening 19 in the movable sheave halve which receives the setscrew in the fixed sheave halve may have a grease fitting 80 threadedly received therein so as to provide proper lubrication between the hub 30 and the shaft 14.

What is claimed is:

1. In a pulley having a pair of cooperating sheave halves supported on a shaft for rotation therewith, the improvement of each of said sheave halves being identical in construction and each comprising a hub having a central axis; a plate having a central aperture receiving said hub, said plate being fixedly secured to said hub; a disc having a central aperture aligned with said axis, said disc comprising a substantially circular sheet metal member having its outer end inclined with respect to said axis; and cooperating means fixedly connecting said disc to said plate whereby said hub, plate and disc define one of said sheave halves and said outer ends of said discs define bearing surfaces for a belt, said cooperating means including deformed portions on said sheet metal member defining elongated radially extending ribs, said ribs extending away from said bearing surfaces, and said plate having means defining slots, each said slots receiving at least a portion of said ribs.

2. A pulley as defined in claim 1, in which said disc is welded to said plate to define a portion of said cooperating means.

3. A pulley as defined in claim 1, including the further improvement of each said discs having a plurality of circumferentially spaced openings adjacent the inner ends thereof, said openings of one of said discs having pins therein, said pins extending through the openings of the other of said discs.

4. In a variable speed pulley having a fixed sheave half and a movable sheave supported on a shaft, the improvement of said sheave halves being identical in construction and each comprising a hub having a first and second reduced portions on one end thereof; a circular, substantially flat plate having a central aperture receiving said first reduced portion, said plate being secured to said hub, said plate having circumferentially spaced slots extending radially from the peripheral edge to the center of said plate; and a disc comprising a circular sheet metal member having an aperture receiving said second reduced portion, said sheet metal member having an inclined outer end portion, said sheet metal member further having elongated radially extending, circumferentially spaced deformed portions defining ribs, said ribs being equal in number to said slots and each having an inner end received in respective ones of said slots, and means fixedly securing said sheet metal member to said plate.

5. A variable speed pulley as defined in claim 4, including the further improvement of each said sheave halves having circumferentially spaced openings adjacent the inner end thereof; a plurality of pins received in respective ones of the openings in one of said sheave halves, said pins extending between said sheave halves and having opposite ends received in respective ones of the openings in the other of said sheave halves, said pins cooperating to define the minimum diameter for a belt received between said sheave halves.

6. A variable speed pulley as defined in claim 4, in which said sheet metal member has a flat portion between said inclined portion and the member aperture, said flat portion being in contacting engagement with one surface of said plate.

7. A method of producing a sheave half for a variable speed pulley which comprises the steps of: forming a hub having a central opening for receiving a shaft; forming a plate with a central aperture and a plurality of circumferentially spaced slots extending radially from the peripheral edge thereof; forming a sheet metal member with a central aperture; deforming the sheet metal member to produce a plurality of radially extending circumferentially spaced ribs equal in number to said slots; arranging the plate, hub and sheet metal member so that (1) a portion of each rib is received in a slot and (2) one end of the hub is received in the central aperture in the plate and the sheet metal member; and interconnecting the hub, plate and sheet metal member by welding.

8. The method as defined in claim 7, in which said plate is flat and said deforming of said sheet metal member produces a flat inner portion and an inclined outer portion with said ribs bridging said portions; and in which said flat portion of said sheet metal member is placed in extended engagement with a surface of said plate when the plate and hub are assembled.

9. The method as defined in claim 7, in which said one end of said hub has first and second portions respectively of smaller diameter to produce first and second shoulders with said plate engaging said first shoulder and said sheet metal member engaging said second shoulder.

10. In a pulley having a pair of cooperating sheave halves supported on a shaft for rotation therewith, the improvement of each of said sheave halves being identical in construction and each comprising a hub having a central axis; a substantially flat plate having a tapered portion on the outer end of one surface thereof and a central aperture receiving said hub, said plate being fixedly secured to said hub; and a disc having a central aperture aligned with said axis, said disc comprising a substantially circular sheet metal member having a flat inner end portion in contacting engagement with said one surface, said member having its outer end inclined with respect to said axis with the inner end of said inclined portion in contacting engagement with said tapered portion of said plate; and cooperating means fixedly connecting said disc to said plate whereby said hub, plate and disc define one of said sheave halves and said outer ends of said discs define bearing surfaces for a belt.